United States Patent
Park

(10) Patent No.: US 12,197,862 B2
(45) Date of Patent: Jan. 14, 2025

(54) METHOD FOR IDENTIFYING A WORD CORRESPONDING TO A TARGET WORD IN TEXT INFORMATION

(71) Applicant: ActionPower Corp., Seoul (KR)

(72) Inventor: Seongmin Park, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 17/980,423

(22) Filed: Nov. 3, 2022

(65) Prior Publication Data

US 2024/0028827 A1    Jan. 25, 2024

(30) Foreign Application Priority Data

Jul. 15, 2022  (KR) .................. 10-2022-0087521

(51) Int. Cl.
*G06F 16/33* (2019.01)
*G06F 40/166* (2020.01)
*G06F 40/279* (2020.01)
*G06F 40/53* (2020.01)
(Continued)

(52) U.S. Cl.
CPC ........ *G06F 40/279* (2020.01); *G06F 16/3344* (2019.01); *G06F 40/166* (2020.01); *G06F 40/53* (2020.01); *G10L 15/187* (2013.01); *G10L 15/22* (2013.01)

(58) Field of Classification Search
CPC ...... G06F 40/279; G06F 40/166; G06F 40/53; G06F 16/3344; G10L 15/187; G10L 15/22; G10L 15/063
See application file for complete search history.

(56) References Cited

U.S. PATENT DOCUMENTS 7,483,833 B2    1/2009  Peters
8,103,506 B1 *  1/2012  Meyer ................. G06F 40/20
                                                  704/260
(Continued)

FOREIGN PATENT DOCUMENTS

CN    108920513 A  * 11/2018  ....... G06Q 10/06395
CN    111951805 A  * 11/2020  ........... G06F 40/279
(Continued)

OTHER PUBLICATIONS

Wang, Yu-Chun, and Richard Tzong-Han Tsai. "Rule-based Korean grapheme to phoneme conversion using sound patterns." Proceedings of the 23rd Pacific Asia Conference on Language, Information and Computation, vol. 2. (Year: 2009).*

(Continued)

*Primary Examiner* — Daniel C Washburn
*Assistant Examiner* — Oluwadamilola M Ogunbiyi
(74) *Attorney, Agent, or Firm* — MARSHALL, GERSTEIN & BORUN LLP

(57) ABSTRACT

Disclosed is a method for identifying a word corresponding to a target word in text information, which is performed by one or more processors of a computing device. The method may include: determining a target word; determining a threshold for an edit distance associated with the target word; determining a word of which the edit distance from the target word among words included in text information is equal to or less than the threshold; and identifying the word corresponding to the target word based on the determined word.

12 Claims, 10 Drawing Sheets

(51) Int. Cl.
*G10L 15/187* (2013.01)
*G10L 15/22* (2006.01)

(56) References Cited

U.S. PATENT DOCUMENTS

| | | | | |
|---|---|---|---|---|
| 8,185,392 | B1* | 5/2012 | Strope | G10L 15/01 |
| | | | | 704/251 |
| 9,183,297 | B1* | 11/2015 | Baker | G06F 16/951 |
| 9,298,700 | B1* | 3/2016 | Jesensky | G06F 40/289 |
| 9,984,682 | B1* | 5/2018 | Tao | G10L 15/183 |
| 10,032,046 | B1 | 7/2018 | Hayashi et al. | |
| 10,395,640 | B1* | 8/2019 | Beach | G10L 15/26 |
| 11,563,846 | B1* | 1/2023 | Mattarella-Micke | |
| | | | | H04M 3/42025 |
| 2003/0069729 | A1* | 4/2003 | Bickley | G10L 15/08 |
| | | | | 704/E15.014 |
| 2003/0154080 | A1* | 8/2003 | Godsey | G10L 19/0018 |
| | | | | 704/251 |
| 2006/0004577 | A1* | 1/2006 | Nukaga | G10L 13/047 |
| | | | | 704/267 |
| 2007/0083366 | A1* | 4/2007 | Peters | G10L 15/26 |
| | | | | 704/235 |
| 2007/0244702 | A1* | 10/2007 | Kahn | G10L 15/22 |
| | | | | 704/E15.04 |
| 2011/0196932 | A1* | 8/2011 | Jackson | H04L 51/043 |
| | | | | 709/206 |
| 2012/0290299 | A1* | 11/2012 | Basson | G10L 15/26 |
| | | | | 704/235 |
| 2013/0132090 | A1 | 5/2013 | Kanda | |
| 2014/0058723 | A1* | 2/2014 | Shen | G06F 40/279 |
| | | | | 704/9 |
| 2015/0169951 | A1* | 6/2015 | Khintsitskiy | G06V 30/418 |
| | | | | 382/182 |
| 2015/0179169 | A1* | 6/2015 | John | G10L 15/1815 |
| | | | | 704/257 |
| 2017/0004120 | A1* | 1/2017 | Eck | G06F 40/289 |
| 2017/0110114 | A1* | 4/2017 | Edelson | G06F 40/126 |
| 2017/0287465 | A1* | 10/2017 | Zhao | G10L 15/063 |
| 2018/0053500 | A1* | 2/2018 | Sak | G10L 15/02 |
| 2018/0061417 | A1* | 3/2018 | Radadia | G10L 15/26 |
| 2018/0121800 | A1* | 5/2018 | Kanda | G06N 3/04 |
| 2018/0211661 | A1* | 7/2018 | Kudo | G10L 15/22 |
| 2019/0034407 | A1* | 1/2019 | Hagiwara | G06F 18/295 |
| 2019/0206389 | A1* | 7/2019 | Kwon | G10L 15/07 |
| 2019/0279612 | A1* | 9/2019 | Kulkarni | G10L 15/065 |
| 2020/0126548 | A1* | 4/2020 | Kim | G10L 15/22 |
| 2020/0219413 | A1* | 7/2020 | Kobashikawa | G09B 5/04 |
| 2021/0043196 | A1* | 2/2021 | Lee | H04M 3/42025 |
| 2021/0074266 | A1* | 3/2021 | Lu | G10L 15/063 |
| 2021/0110259 | A1* | 4/2021 | Lee | G06N 20/20 |
| 2021/0182488 | A1* | 6/2021 | Gharpure | A61B 5/123 |
| 2021/0183378 | A1* | 6/2021 | Gharpure | G10L 25/33 |
| 2021/0264895 | A1* | 8/2021 | Fujimura | G10L 15/26 |
| 2022/0165253 | A1* | 5/2022 | Sharifi | G10L 15/22 |
| 2022/0262350 | A1* | 8/2022 | Rao | G10L 15/187 |
| 2022/0283849 | A1* | 9/2022 | Miller | H04M 1/72412 |
| 2022/0310076 | A1* | 9/2022 | Kumar | G10L 25/33 |
| 2022/0310096 | A1* | 9/2022 | Choi | G10L 25/51 |
| 2022/0386902 | A1* | 12/2022 | Vanpoucke | A61B 5/123 |
| 2023/0055233 | A1* | 2/2023 | Ji | G10L 15/183 |
| 2023/0089308 | A1* | 3/2023 | Wang | G10L 15/26 |
| | | | | 704/232 |
| 2023/0096939 | A1* | 3/2023 | Nguyen | G10L 15/16 |
| | | | | 704/232 |
| 2023/0178094 | A1* | 6/2023 | Amid | G10L 15/08 |
| | | | | 704/200 |
| 2023/0215427 | A1* | 7/2023 | Mittal | G10L 19/00 |
| | | | | 704/232 |
| 2023/0298593 | A1* | 9/2023 | Ramos | G06N 3/088 |
| | | | | 704/233 |
| 2023/0394169 | A1* | 12/2023 | Ganong, III | G10L 15/22 |

FOREIGN PATENT DOCUMENTS

| | | | | |
|---|---|---|---|---|
| CN | 113012705 A | | 6/2021 | |
| CN | 113297579 A | * | 8/2021 | G06F 21/56 |
| CN | 113299282 A | * | 8/2021 | G10L 15/063 |
| CN | 108920513 B | * | 3/2022 | G06Q 10/06395 |
| DE | 112014006591 T5 | * | 3/2017 | G06F 17/2705 |
| JP | 2004-258531 A | | 9/2004 | |
| JP | 2007-509377 A | | 4/2007 | |
| JP | 2012-128672 A | | 7/2012 | |
| JP | 2013-109061 A | | 6/2013 | |
| JP | 2016065924 A | * | 4/2016 | G10L 15/063 |
| JP | 2016-180916 A | | 10/2016 | |
| JP | 2018-163342 A | | 10/2018 | |
| JP | 2019087123 A | * | 6/2019 | G06F 17/2705 |
| KR | 101322394 B1 | | 10/2013 | |
| KR | 101711941 B1 | | 3/2017 | |
| KR | 101782923 B1 | | 9/2017 | |
| KR | 10-2019-0030970 A | | 3/2019 | |
| KR | 20210016767 A | * | 2/2021 | G10L 15/14 |
| KR | 102260219 B1 | | 6/2021 | |
| KR | 10-2022-0048248 A | | 4/2022 | |
| TW | 1612472 B | * | 1/2018 | G06F 40/279 |
| WO | WO-2020119432 A1 | * | 6/2020 | G10L 15/02 |
| WO | WO-2020224119 A1 | * | 11/2020 | G06F 17/2705 |
| WO | WO-2022/042512 A1 | | 3/2022 | |
| WO | WO-2022148239 A1 | * | 7/2022 | G06Q 10/06395 |

OTHER PUBLICATIONS

Koşaner, Özgün, Çağdas Can Birant, and Özlem Aktaş. "Improving Turkish language training materials: Grapheme-to-phoneme conversion for adding phonemic transcription into dictionary entries and course books." Procedia-Social and Behavioral Sciences 103: 473-484. (Year: 2013).*
Korean Office Action for Application No. 10-2022-0087521, dated Oct. 6, 2022.
Korean Notice of Allowance for Application No. 10-2022-008521, dated Feb. 24, 2023.
Japanese Office Action for Application No. 2023-114241, dated Oct. 10, 2023.

* cited by examiner

METHOD FOR IDENTIFYING A WORD CORRESPONDING TO A TARGET WORD IN TEXT INFORMATION

CROSS-REFERENCE TO RELATED APPLICATIONS

This application claims priority to and the benefit of Korean Patent Application No. 10-2022-0087521 filed in the Korean Intellectual Property Office on Jul. 15, 2022, the entire contents of which are incorporated herein by reference.

TECHNICAL FIELD

The present disclosure relates to a method for identifying a word, and more particularly, to technology of identifying a word corresponding to a target word in text information.

BACKGROUND

Voice recognition, also called automatic voice recognition (ASR), computer voice recognition or speech-to-text, is a function that allows a program to handle a human voice in a text format. A sentence output as a result of voice recognition is not often a perfect text. For example, a spoken word is "의자" and a sentence output as a result of STT (Speech-to-Text) may include 의쟈", "이자 ", "으자 ", etc. In the process of reviewing the Speech-to-Text (STT) result sentence, a user wants to change the word to "의자" in a batch, but there is a hassle that the user should personally change the word while checking the word one by one.

Meanwhile, text summarization can generate a short amount of text by referring to an original document. An operation scheme of a text summary model is largely divided into two kinds of 1) extraction summarization of creating the sentence by combining words drawn from the document, and 2) abstraction of creating the sentence by using a word or an expression which is not used in the document without changing a meaning. However, the extraction scheme has a problem in that a selected word cannot sufficiently represent the document or a problem in that there is a poor response between the selected words cannot be solved.

Therefore, the present disclosure proposes a method for searching a keyword having a similar pronunciation to a keyword to be checked by the user from the sentence generated as the voice recognition result, the sentence output by the text summarization, etc.

Korean Patent Registration No. 10-1711941 (Feb. 24, 2017) discloses a method for generating an out-of-vocabulary based on a similarity in a voice recognition system.

SUMMARY

The present disclosure has been made in an effort to provide a method for identifying a word (e.g., a similar word) corresponding to a target word in text information (e.g., a sentence output as a result of voice recognition, a sentence generated by a text generation model, etc.).

The present disclosure has been made in an effort to solve problems which may occur in a process of searching a plurality of keywords having a similar pronunciation to a target keyword to be checked by a user in a speech-to-text (STT) result in some exemplary embodiments.

Meanwhile, a technical problem to be solved by the present disclosure is not limited to the above-mentioned technical problem, and various technical problems can be included within the scope which is apparent to those skilled in the art from contents to be described below.

An exemplary embodiment of the present disclosure provides a method performed by a computing device. The method may include: determining a target word; determining a threshold for an edit distance associated with the target word; determining a word that the the edit distance from the target word among words included in text information is equal to or less than the threshold; and identifying the word corresponding to the target word based on the determined word.

Alternatively, the determining of the target word may include at least one of determining the target word based on a keyword dictionary of a predetermined field, determining a word of which emergency frequency is equal to or more than a threshold in the text information as the target word, or determining the target word based on input information received through a user interface.

Alternatively, the text information may include text information generated through voice recognition, and the determining of the target word may include determining the target word based on a confidence related to the voice recognition.

Alternatively, the text information may include the text information generated through the voice recognition, and the identifying of the word corresponding to the target word may further include calculating a similarity between voice information associated with the target word and voice information associated with the text information, and identifying the word corresponding to the target word by additionally considering the calculated similarity.

Alternatively, the determining of the threshold for the edit distance may include dynamically determining the threshold for the edit distance in response to a length of the target word.

Alternatively, the dynamically determining of the threshold for the edit distance may include dynamically determining the threshold for the edit distance based on a calculation between the length of the target word and a predetermined ratio threshold.

Alternatively, the determining of the threshold for the edit distance further may include determining an absolute threshold, and the determining of the word of which the edit distance from the target word is equal to or less than the threshold may further include determining a word of which the edit distance from the target word is equal to or less than the dynamically determined threshold, and equal to or less than the absolute threshold.

Alternatively, the determining of the word of which the edit distance from the target word is equal to or less than the threshold may include dividing the target word into k+1 elements when the determined threshold is k, searching the k+1 elements in the text information, identifying the word based on the searched element when at least one element among the k+1 elements is searched in the text information, and determining that there is no word of which the edit distance is equal to or less than the threshold when the k+1 elements are not searched in the text information.

Alternatively, the word corresponding to the target word may be determined based on a pronunciation or a text, and the edit distance may be calculated based on the pronunciation or the text.

Alternatively, the edit distance may be determined based on the pronunciation, and the identifying of the word of which the edit distance from the target word is equal to or less than the threshold may include converting words included in the text information and the target word into pronunciation symbols, identifying pronunciation symbols of which the edit distance from the pronunciation symbols for the target word is equal to or less than the threshold among the pronunciation symbols for the text information, and identifying the word based on the identified pronunciation symbols.

Alternatively, the converting of the words included in the text information and the target word into the pronunciation symbols may include converting the words included in the text information and the target word into an International Phonetic Alphabet (IPA) alphabet, converting the converted IPA alphabets into Roman notations, separating the converted Roman notations into grapheme units, and converting the separated grapheme unit into a phoneme unit.

Alternatively, the edit distance may be determined based on the text, and the identifying of the word of which the edit distance from the target word is equal to or less than the threshold may include converting the words included in the text information and the target word into the grapheme units, identifying graphemes of which the edit distance from the graphemes for the target word is equal to or less than the threshold among the graphemes for the text information, and identifying the word based on the identified graphemes.

Alternatively, the identifying of the word of which the edit distance from the target word is equal to or less than the threshold may include converting the words included in the text information and the target word into the pronunciation symbols or the graphemes, and the converting of the words included in the text information and the target word into the pronunciation symbols or the graphemes may include selecting whether to consider at least one of a spacing or the sentence symbol.

Another exemplary embodiment of the present disclosure provides a computer program stored in a computer-readable storage medium. The computer program executes the following operations for identifying a word corresponding to a target word in text information when the computer program is executed by one or more processors and the operations may include: an operation of determining a target word; an operation of determining a threshold for an edit distance associated with the target word; an operation of determining a word of which the edit distance from the target word among words included in text information is equal to or more?less than the threshold; and an operation of identifying the word corresponding to the target word based on the determined word.

Still another exemplary embodiment of the present disclosure provides a computing device. The device may include: at least one processor; and a memory, and at least one processor is configured to determine a target word, determine a threshold for an edit distance associated with the target word, determine a word of which the edit distance from the target word among words included in text information is equal to or less than the threshold, and identify the word corresponding to the target word based on the determined word.

According to an exemplary embodiment of the present disclosure, there can be provided a method for identifying a word (e.g., a similar word) corresponding to a target word in text information (e.g., a sentence output as a result of voice recognition, a sentence generated by a text generation model, etc.).

According to an exemplary embodiment of the present disclosure, when the present disclosure is associated with voice recognition such as speech-to-text (STT), additional technical effects can be implemented. For example, according to an exemplary embodiment of the present disclosure, there can be provided a text method that can more conveniently change similar words in a batch when a user modifies an imperfect text result output from the speech-to-text (STT) by determining similar word based on an edit distance. Further, according to an exemplary embodiment of the present disclosure, it is possible to provide a similar word result more suitable for an intension to the user by excluding error cases (e.g., spacing and a sentence symbol) which may occur when searching the similar word from a search result with respect to the text result output from the speech-to-text (STT). Further, according to an exemplary embodiment of the present disclosure, a resource can be optimized in determining the similar word by dynamically determining a threshold value of an edit distance for determining the similar word according to a length of the target word, and a personalized speech-to-text (STT) model can be generated by customizing a speech-to-text (STT) model by using a target word-similar word pair corresponding to a voice for each user.

Meanwhile, the effects of the present disclosure are not limited to the above-mentioned effects, and various effects can be included within the scope which is apparent to those skilled in the art from contents to be described below.

DETAILED DESCRIPTION

Figure 1:
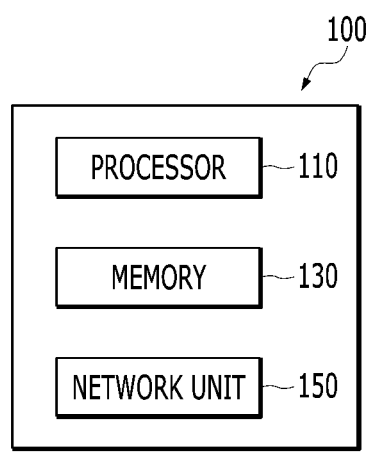
FIG. 1 is a block diagram of a computing device for identifying a word corresponding to a target word in text information according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for identifying a word corresponding to a target word in text information according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

The processor 110 according to an exemplary embodiment of the present disclosure may determine a target word in acquired text information, determine a threshold for an edit distance associated with the target word, determine a word of which the edit distance from the target word among words included in the text information is equal to or less than the threshold, and identify a word corresponding to the target word based on the determined word. Further, the processor 110 may perform smoothing based on the identified word. For example, the processor 110 may also identify a plurality of words corresponding to the target word, and also change the plurality of identified words in a batch (e.g., change the plurality of identified words to the target word in a batch, change the plurality of identified words and the target word to one word among a plurality of words in a batch, etc.). Further, the processor 110 may solve problems which may occur in a process of searching a plurality of words having a similar pronunciation to a target word to be checked by a user.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

For example, the network unit 150 may receive text information from an external system. In this case, information received from a database may be text information for identifying the word corresponding to the target word. The text information may include the information of the examples, but is not limited to the above-described example, and may be variously constituted within a range which may be appreciated by those skilled in the art.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150.

Meanwhile, according to an exemplary embodiment of the present disclosure, the computing device 100 as a computing system that transmits and receives information to and from the client through communication may include a server. In this case, the client may be any type of terminal which may access the server. For example, the computing device 100 which is the server may determine the word similar to the target word by receiving the text information from the external database, and provide the word corresponding to the target word to the user terminal through the user interface based on the determined word. In this case, the user terminal may output the user interface received from the computing device 100 as the server, and receive and process the information through an interaction with the user.

In an additional exemplary embodiment, the computing device 100 may also include any type of terminal that performs additional information processing by receiving a data resource generated in any server.

Figure 2:
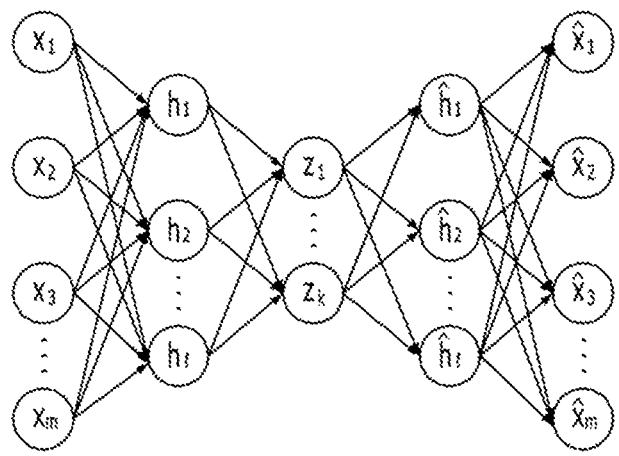
FIG. 2 is a conceptual view illustrating a neural network according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons.

The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
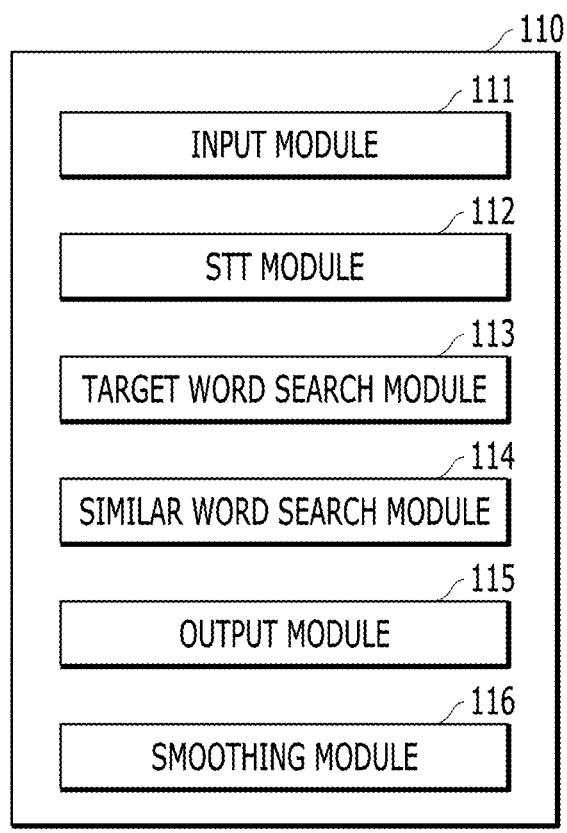
FIG. 3 is a schematic block diagram of a module included in the computing device for identifying a word corresponding to a target word in text information according to an exemplary embodiment of the present disclosure.

FIG. 3 is a schematic block diagram of a module included in the computing device for identifying a word corresponding to a target word in text information according to an exemplary embodiment of the present disclosure.

According to an exemplary embodiment of the present disclosure, the processor 110 may include an input module 111, an STT module 112, a target word search module 113, a similar word search module 114, an output module 115, and a smoothing module 116. However, a configuration of the module included in the processor is not limited thereto.

According to an exemplary embodiment of the present disclosure, the input module 111 may directly acquire or receive, from the external system, a text for identifying the word corresponding to the target word in the text information. Here, the text information is a sentence which becomes a target to change the identified word according to an exemplary embodiment of the present disclosure. Further, the external system may be a server and a database storing and managing text sentences. Further, the input module 111 may acquire a voice signal or a spectrogram into which the voice signal is converted. Meanwhile, the input module 111 may also acquire text information which is an output result of a text generation model. That is, the text information may include the text information generated through voice recognition and the text information which is the output result of the text generation model such as an abstract generation model. Further, the input module 111 may receive input information through the user interface. For example, the input information may include target word determination information, etc.

When the STT module 112 according to an exemplary embodiment of the present disclosure receives the voice signal from the input module 111, the STT module 112 may perform preprocessing by using VAD, Denoiser, Speech enhancement, etc. As an example, the voice activity detection (VAD) is a technique that judges whether a voice activity is detected from an audio stream. Further, the STT module 112 may perform the voice recognition based on binary classification for distinguishing whether a short voice interval (e.g., 0.01 s) is a portion pronounced by a person (1) or the short voice interval is not the portion pronounced by the person (0) or distribution based classification for discriminating to which a distribution of spoken voices and a distribution of noise voices the voice is closer. As an example, WebrtcVAD may be used in the voice recognition, but the present disclosure is not limited thereto, and an algorithm which is developed in advance or developed in the future may be applied. Further, the STT module 112 may convert the recognized voice into the text information. The STT module 112 may receive, from the input module 111, a voice signal having a variable length, which converts an analog wave signal into a digital signal or a spectrogram into which the voice signal is converted through Fourier transform, and generate a single letter, a single word, or contiguous text information of a character string type, which has the variable length as the output result. Further, the STTT module 112 as an exemplary structure may have a Sequence-to-Sequence (Seq-to-Seq) structure utilizing deep learning, and the Seq-to-Seq structure may be constituted by an encoder and a decoder. Meanwhile, a decoding technique outputting the word or letter by receiving the voice signal as an input may adopt a beam search technique, etc. Here, the beam search technique is a method that does not adopt a letter having a highest probability greedily when predicting a next letter based on an encoded voice signal and a previously predicted letter, but finds a most optimal correct answer text by finally considering the entire sentence and context with upper n candidate groups by opening various possibilities. That is, when the STT module 112 acquires the voice signal from the input module 111, the STT module 112 may output the text information by recognizing the voice.

The target word search module 113 according to an exemplary embodiment of the present disclosure may determine the target word. The target word search module 113 may determine the target word to search the word (e.g., the similar word) by determining a keyword in the text information according to a keyword extraction technique. There may be one target word or a plurality of (group) of target words. Hereinafter, for convenience of description, an exemplary embodiment of one target word will be described.

More specifically, for example, the target word search module 113 may ① determine the target word based on a keyword dictionary of a predetermined field, ② determine a word of which emergency frequency is equal to or more than a threshold as the target word in the text information, or ③ determine the target word based on input information received through the user interface. For example, the target word search module 113 may extract "의자" as the target word from the text information through ① or ② or receive "의자" from the user interface.

The target word search module 113 may ④ determine the target word based on a confidence related to the voice recognition when the text information is the text information generated through the voice recognition. For example, the target word search module 113 may identify a word having a low confidence of the voice recognition among the words included in the text information acquired from the STT module 112, and determine the word identified to have the low confidence as the target word. Meanwhile, the target word determined based on the confidence of the voice recognition may be distinguished and displayed through the user interface. As an example, the target word determined based on the confidence of the voice recognition may be highlighted displayed and output in the user interface, and when the user generates an input associated with the corresponding target word (e.g., places a mousse on a location of the corresponding target word or generates a touch input), associated similar words may be displayed jointly.

Consequently, the target word search module 113 may determine the target word based on the text information or voice recognition related information without the input information received from the user like ①, ②, and ④, or determine the target word by considering the input information received from the user like ③, and determine the target word through various schemes in addition to the schemes.

The similar word search module 114 according to an exemplary embodiment of the present disclosure may determine the threshold for the edit distance associated with the target word. Further, the similar word search module 114 may dynamically determine the threshold for the edit distance associated with the target word. For example, the similar word search module 114 may dynamically determine the threshold for the edit distance in response to the length of the target word. More specifically, the similar word search module 114 may dynamically determine the threshold for the edit distance based on a calculation between the length of the target word and a predetermined ratio threshold $k_d$. For example, the similar word search module 114 multiplies a length l of a target word q by the ratio threshold $k_d$ and rounds up a multiplication value to determine the dynamic edit distance for each target word q. Here, the ratio threshold $k_d$ may also be designated for each target word q by the user or a predetermined threshold. When a target word set Q including a plurality of target words is generated, the similar word search module 114 may efficiently use a resource by dynamically setting the threshold k according to a size of each of target words $q_i$ included in the target word set Q. Additionally, the similar word search module 114 may also determine an absolute threshold $k_a$ for the edit distance, and search the similar word by considering both the absolute threshold $k_a$ and the ratio threshold $k_d$.

The similar word search module 114 according to an exemplary embodiment of the present disclosure may determine a word of which the edit distance from the target word is equal to or less than the threshold among the words included in the text information. For example, the similar word search module 114 may determine (search) a word such as "이자", "으자", "의쟈", etc., of which an edit distance from "의자" is equal to or less than the threshold in text data. Further, the similar word search module 114 may determine a word of which the edit distance from the target word is equal to or less than "dynamically determined threshold" among the words included in the text information. Further, the similar word search module 114 may determine a word of which the edit distance from the target word is equal to or less than the "dynamically determined threshold" and equal to or less than the "absolute threshold $k_a$" among the words included in the text information. That is, the similar word search module 114 may also identify words which satisfy both the dynamic threshold and the absolute threshold in a relationship with the target word, and determine the corresponding words as the similar words. Meanwhile, the similar word search module 114 may generate the target word set Q={$q_1, q_2, \ldots, q_n$} including the plurality of target words when there are the plurality of target words, and search words having a similar pronunciation to the target word set in the text information T. For example, the similar word search module 114 may dynamically determine each threshold for each of the plurality of target words included in the target word set, identify the similar words of the respective target words based on the determined threshold, and generate a similar word set corresponding to the target word set based on the identified words.

Meanwhile, the edit distance may be determined by various schemes. For example, the edit distance may be defined as a minimum edit number required for converting one character string of two character strings into the other character string when there are two character strings. Further, here, the type of edit may include character deletion, insertion, substitution, etc. Further, the edit distance may be calculated based on the pronunciation or calculated based on the text. For example, the edit distance may also be calculated based on conversion of the text into a pronunciation symbol or calculated based on the text itself (e.g., calculated by the unit of a grapheme). Meanwhile, an edit distance algorithm may include Levenshtein distance, Longest common subsequence, Hamming distance, etc., and include various algorithms in addition to the algorithm.

With respect to the text information T and the target word set Q={$q, q_2, \ldots, q_n$} (in this case, both T are $q_i$ character strings having a length of 1 or more), when a character string interval of which an edit distance from a predetermined element of the target word Q in the text information T is equal to or less than the threshold k is searched, if a naïve edit distance algorithm or a simple edit distance calculation algorithm is used, there is a problem in that a runtime exponentially increases. The similar word search module 114 according to an exemplary embodiment of the present disclosure may utilize approximate information for a plurality of character strings included in the target word set or the text information, and also perform a search by utilizing approximated information, in order to solve the problem. For example, the similar word search module 114 according to an exemplary embodiment of the present disclosure may determine a word of which the edit distance from the target word is equal to or less than the threshold among the words included in the text information by using a multi-string approximate (fuzzy) matching algorithm.

Figure 4:
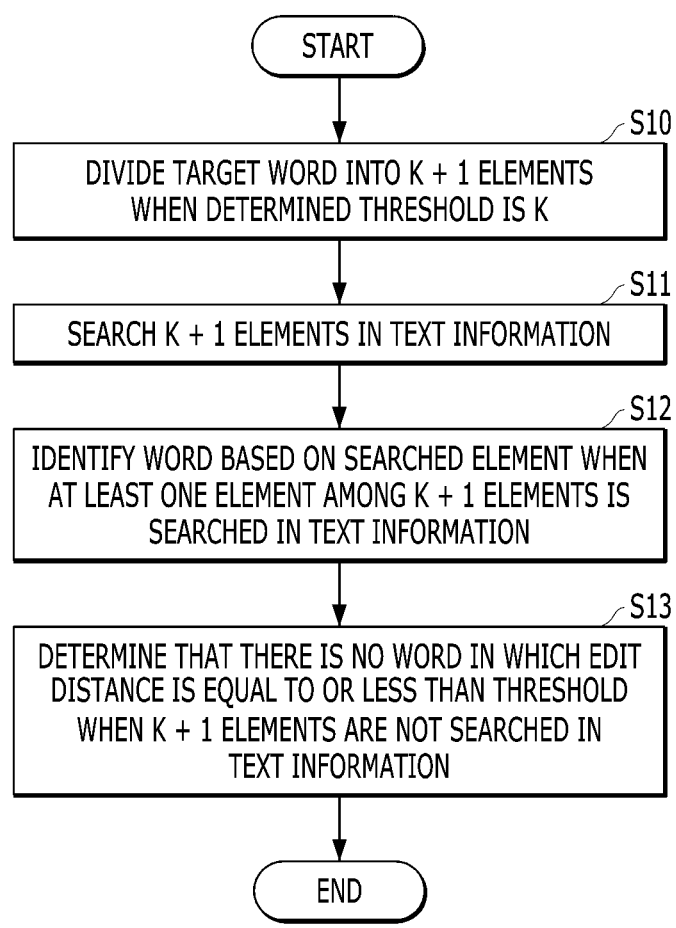
FIG. 4 is a flowchart schematically illustrating an exemplary embodiment of searching an interval of which an edit distance is equal to or less than k in order to identify a word corresponding to a target word in text information according to an exemplary embodiment of the present disclosure.

FIG. 4 is a flowchart schematically illustrating an exemplary embodiment of searching an interval of which an edit distance is equal to or less than k in order to identify a word corresponding to a target word in text information according to an exemplary embodiment of the present disclosure.

Referring to FIG. 4, the similar word search module 114 may divide the target word into k+1 elements when the determined threshold is k (S10). Here, the elements may include elements (e.g., the pronunciation symbol, etc.) associated with the voice, or elements (e.g., grapheme-unit elements, etc.) associated with the text itself, etc. Further, the similar word search module 114 may search k+1 elements in the text information (S11). Further, the similar word search module 114 may identify the word based on the searched element when at least one element among k+1 elements is searched in the text information (S12). Further, the similar word search module 114 may determine that there is no word of which the edit distance is equal or less than the threshold when k+1 elements are not searched in the text information (S13).

For example, the similar word search module 114 may determine the word of which the edit distance from the target word is equal to or less than the threshold among the words included in the text information by using a PEX algorithm when the number of target words Q to be searched is 1 (e.g., when the size of the target word set Q is 1). Further, the similar word search module 114 may determine an interval of which the edit distance from the target word (a unique element of q or Q) is equal to or less than the threshold k in the text information T, and identify words based on the determined interval. In this case, the similar word search module 114 may determine the interval of which the edit distance from the target word is equal to or less than the threshold k in the text information T based on a premise that "when there is a correct answer interval (i.e., there is the interval of which the edit distance from the target word is equal to or less than the threshold k) in the text information T, if the target word is divided into k+1 elements, at least one of k+1 elements belongs to the correct answer interval". For example, the similar word search module 114 may search k+1 elements in the text information T by using a multi-string exact matching algorithm (e.g., Aho-corasick, etc.) (S11) after dividing the target word q into k+1 elements (S10), and when at least one element of k+1 elements is searched in the text information T, the similar word search module 114 may identify the word of which the edit distance is equal to or less than the threshold k in an interval (e.g., an interval which is as large as the length of the target word q in both sides of the searched element) around the searched element (S12). Further, the similar word search module 114 may determine that "there is no word of which the edit distance from the target word q is equal or less than the threshold k" in the text information T when all k+1 elements are not searched in the text information T (S13).

As another example, the similar word search module 114 may determine the word of which the edit distance from the target word is equal to or less than the threshold among the words included in the text information by using the multi-PEX algorithm when the number of target words to be searched is equal to or more than 2 (e.g., when the size of the target word set Q is equal to or more than 2). First, the similar word search module 114 may divide all target words included in the target word set Q into k+1 elements (S10). Further, the similar word search module 114 may apply the elements of all target word sets Q to the same multi-string exact matching algorithm and search the elements at once (S11). As an example, the similar word search module 114 may search the elements of all target word sets Q included in one trie when using the Aho-corasick algorithm. Further, the similar word search module 114 may search whether there is the word of which the edit distance is equal to or less than the threshold k in an interval of a text (e.g., as large as the length of the target word Q in both sides) around the element when there is at least one element of the target word set Q in the text information T (S12). Further, the similar word search module 114 may determine that "there is no word of which the edit distance from the target word set Q is equal or less than the threshold k" in the text information T when there is no element of the target word Q searched in the text information T (S13).

According to an exemplary embodiment of the present disclosure, the word corresponding to the target word may be determined based on the pronunciation or the text, and the edit distance may be calculated based on the pronunciation or the text.

Figure 5:
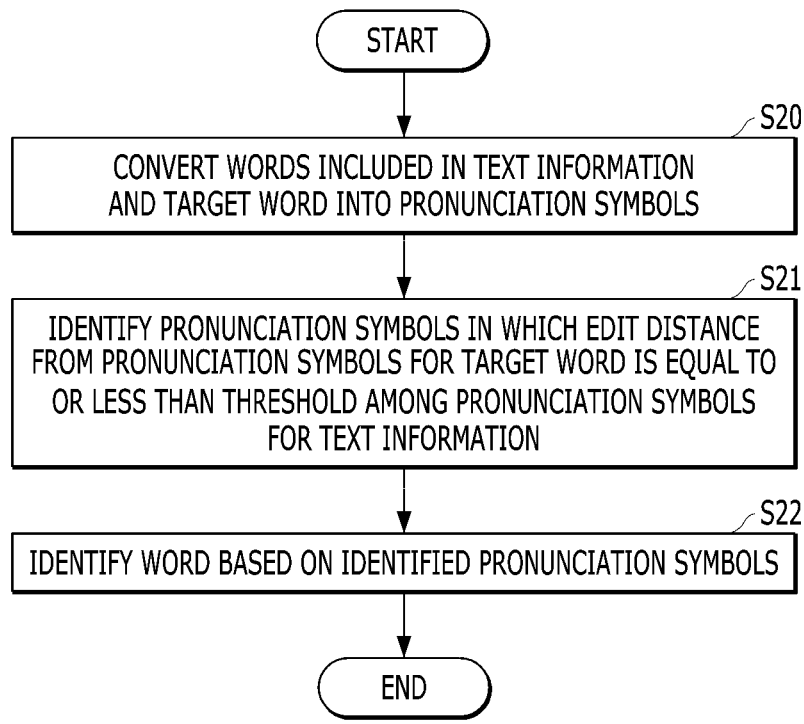
FIG. 5 is a flowchart schematically illustrating an exemplary embodiment of determining the target word based on a pronunciation in order to identify the word corresponding to the target word in the text information according to an exemplary embodiment of the present disclosure.

FIG. 5 is a flowchart schematically illustrating an exemplary embodiment of determining the target word based on a pronunciation in order to identify the word corresponding to the target word in the text information according to an exemplary embodiment of the present disclosure.

Referring to FIG. 5, the similar word search module 114 may convert the words included in the text information and the target word into the pronunciation symbols (S20). In other words, the similar word search module 114 may convert the text information T into pronunciation symbol text information $T_p$ and convert the target word Q into pronunciation symbol target word information $Q_p$. For example, in step S20, the similar word search module 114 may convert the words included in the text information and the target word into an International Phonetic Alphabet (IPA) alphabet. Further, the similar word search module 114 may convert the converted IPA alphabets into a Roman notation. As an example, the similar word search module 114 may convert "선릉" into "seolleung". Further, the converted Roman notations may be separated into grapheme units, and the separated grapheme unit may be converted into a phoneme unit. Further, the similar word search modul1 114 may identify pronunciation symbols of which an edit distance from the pronunciation symbols for the target word is equal to or less than the threshold among the pronunciation symbols for the text information (S21). Here, the threshold for the edit distance may be dynamically determined. Further, the similar word search module 114 may identify the word corresponding to the target word based on the identified pronunciation symbols (S22). Meanwhile, the similar word search module 114 may organize conversion related information through Hash map or list M. For example, the similar word search module 114 may organize a matching relationship between a character index before conversion and a pronunciation symbol index after conversion through the Hash map or list M, and convert a pronunciation based search result into a character based search result again by utilizing the organized Hash map or list M.

Figure 6:
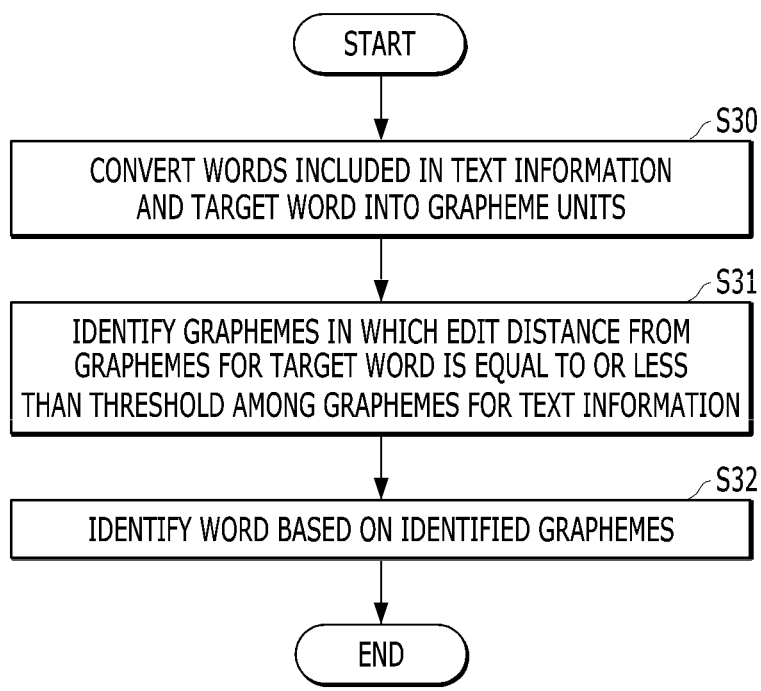
FIG. 6 is a flowchart schematically illustrating an exemplary embodiment of determining the target word based on a text in order to identify the word corresponding to the target word in the text information according to an exemplary embodiment of the present disclosure.

FIG. 6 is a flowchart schematically illustrating an exemplary embodiment of determining the target word based on a text in order to identify the word corresponding to the target word in the text information according to an exemplary embodiment of the present disclosure. Here, the similar word search module 114 may not determine the target word based on the pronunciation described with reference to FIG. 5 above, but determine the target word based on the text.

Referring to FIG. 6, the similar word search module 114 may convert the words included in the text information and the target word into the grapheme unit (S30). Further, the similar word search module 114 may identify graphemes in which of which the edit distance from the graphemes for the target word is equal to or less than the threshold among the graphemes for the text information (S31). Here, the threshold for the edit distance may be dynamically determined. Further, the similar word search module 114 may identify the word based on the identified graphemes (S32).

Figure 7:
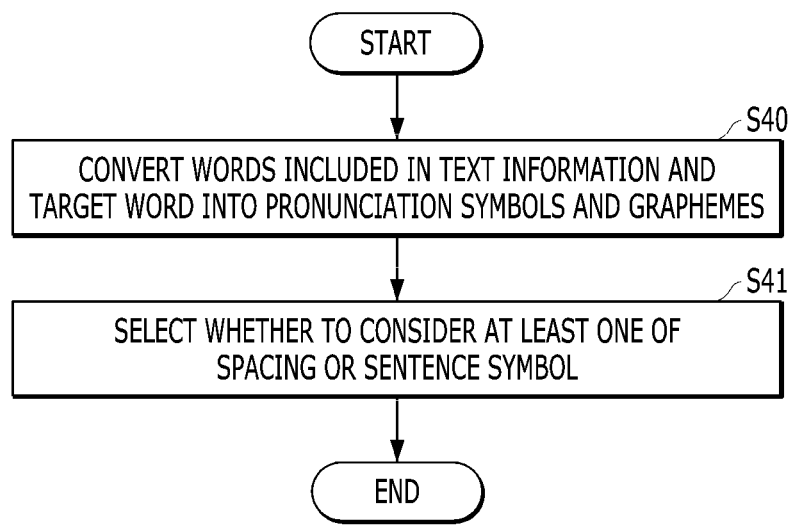
FIG. 7 is a flowchart schematically illustrating an exemplary embodiment of selecting whether spacing or a sentence symbol is included in order to identify the word corresponding to the target word in the text information according to an exemplary embodiment of the present disclosure.

FIG. 7 is a flowchart schematically illustrating an exemplary embodiment of selecting whether spacing or a sentence symbol is included in order to identify the word corresponding to the target word in the text information according to an exemplary embodiment of the present disclosure. In such an exemplary embodiment, the similar word search module 114 may select whether the spacing or sentence symbol is included in order to solve a problem which may occur when determining the word of which the edit distance from the target word is equal to or less than the threshold.

Referring to FIG. 7, the similar word search module 114 may convert the words included in the text information and the target word into the pronunciation symbols or the graphemes (S40). For example, the similar word search module 114 may convert the words included in the text information and the target word into the pronunciation symbols or the graphemes as performed in step S20 or S30. Further, the similar word search module 114 may select whether to consider at least one of the spacing or the sentence symbol (S41). As an example, the similar word search module 114 may receive whether to consider at least one of the spacing or the sentence symbol from the user interface.

More specifically, for example, when the similar word search module 114 does not consider the spacing, the spacing in step S40 may not be included in a conversion result. In other words, when the similar word search module 114 may convert the text information T into the pronunciation symbol text information $T_p$, spacing information may not be included in the pronunciation symbol text information $T_p$. In this case, the similar word search module 114 may store the spacing information in the list M connecting an index of the character string of the text information T and the index of the character string of the pronunciation symbol text information $T_P$. Further, the similar word search module 114 may convert the index in the pronunciation symbol text information $T_P$ into the index in the text information T based on the stored information. As an example, when the spacing is not considered (when the spacing is not included), the target word is "이면지" and when a transcription result (e.g., a result text generated through the voice recognition) is "이 편지", the transcription result may be searched. Further, when the target word is "왕십리" and the transcription result is "왕 쉽니", the transcription result may be searched. Further, when the target word is "뭣도 모르고" and the transcription result is "뭐 또 모르고", the transcription result may be searched.

Meanwhile, when the similar word search module 114 considers the spacing, the spacing may be included in the conversion result in step S40. In other words, when the similar word search module 114 converts the text information T into the pronunciation symbol text information $T_p$, the similar word search module 114 may also maintain the spacing information to be included in the pronunciation symbol text information $T_p$. In this case, the similar word search module 114 may search a match including the spacing after performing the search by using multi-PEX or search the match by using a single-pattern approximate matching algorithm after segmenting each word converted based on the pronunciation into spacing units. As an example, when the spacing is considered (when the spacing is included), the target word is "이면지" and when the transcription result is "이 편지", the transcription result may not be searched. Further, when the target word is "왕십리" and the transcription result is "왕 쉽니", the transcription result may not be searched. Further, when the target word is "뭣도 모르고" and the transcription result is "뭐 또 모르고", the transcription result may not be searched.

When the similar word search module 114 does not consider the sentence symbol, the sentence symbol may not be included in the conversion result in step S40. In other words, when the similar word search module 114 may convert the text information T into the pronunciation symbol text information $T_p$, sentence symbol information may not be included in the pronunciation symbol text information $T_p$. In this case, the similar word search module 114 may store the sentence symbol information in the list M connecting an index of the character string of the text information T and the index of the character string of the pronunciation symbol text information $T_P$. Further, the similar word search module 114 may convert the index in the pronunciation symbol text information $T_P$ into the index in the text information T based on the stored information. As an example, when the sentence symbol is not considered, the target word is "이면지" and when the transcription result (e.g., the result text generated through the voice recognition) is "이 편지", the transcription result may be searched. Further, when the target word is "참조기" and the transcription result is "참, 좋니", the transcription result may be searched.

When the similar word search module 114 considers the sentence symbol, the sentence symbol may be included in the conversion result in step S40. In other words, when the similar word search module 114 converts the text information T into the pronunciation symbol text information $T_p$, the similar word search module 114 may also maintain the sentence symbol to be included in the pronunciation symbol text information $T_p$. As an example, when the sentence symbol is considered, the target word is "이면지" and the transcription result is "이 편지", the transcription result may not be searched in the similar word search module 114. For reference, such an exemplary embodiment is meaningful when the pronunciation symbol text information $T_P$ does not include the spacing information (since when the pronunciation symbol text information $T_P$ includes the spacing information, the search is not made due to the spacing itself regardless of whether to consider the sentence symbol).

According to an exemplary embodiment of the present disclosure, the similar word search module 114 may identify the word (e.g., the similar word) corresponding to the target word in the text information based on the edit distance from the target word. Meanwhile, when the text information to be searched is the text information generated based on the voice recognition, the similar word search module 114 may identify the word corresponding to the target word by additionally utilizing "similarity information between voice information" in addition to the information related to the edit distance. For example, when the target word and the text information are based on the voice recognition, the similar word search module 114 may calculate the similarity between the voice information associated with the target word and the voice information associated with the text information, and identify the word corresponding to the target word by additionally considering the calculated similarity. That is, the similar word search module 114 may identify the word corresponding to the target word by additionally considering the similarity between the voices in addition to the edit distance when the text information is based on the voice recognition. Therefore, when the similar word search module 114 operates with respect to the voice recognition based text information, accuracy may be further enhanced.

According to an exemplary embodiment of the present disclosure, the output module 115 may output the word through the user interface by using a visual effect such as highlight in the output text information. For example, parts "이자", "으자", and "의쟈" which are the identified words in the text information (original text) may be highlighted and output through the user interface.

According to an exemplary embodiment of the present disclosure, the smoothing module 116 may change the identified words to the target word in a batch. For example when the identified word is "이자", "으자", or "의쟈" and the target word is "의자", the smoothing module 116 may change the identified word to the target word in a batch. Further, the smoothing module 116 may change the target word and the identified words to one word among the identified words. For example, when the identified word is "이자", "으자", or "의자" and the target word is "의쟈" (e.g., when "의쟈" judged to have the low confidence of the voice recognition is automatically set to the target word), the smoothing module 116 may change the identified words and the target word into "의자" which is one of the identified words in a batch.

The smoothing module 116 may also provide a UI for requesting user checking before the change in a batch to the user interface.

According to an exemplary embodiment of the present disclosure, "a pair of 'modified text' modified by the user and 'original voice' corresponding thereto" may be acquired by a user input such as a similar word change, and this may be utilized by various methods.

As an example, the 'modified text' is added to a user dictionary of the corresponding account for each user account, so when the corresponding account performs the voice recognition in the future, keyword boosting may be applied to the 'modified text'. The keyword boosting is a technique that increases a priority for a predetermined keyword when the decoder of the voice recognition model performs a beam search, and an STT result text more consistent with the user intention may be output through the keyword boosting.

As another example, the 'modified text'-'original voice' pair may be used for training the personalized voice recognition model for each user account. The voice recognition model personalized in the corresponding account through the 'modified text'-'original voice' pair may better output the 'modified text' without output another similar text for the 'original voice' of the user.

Figure 8:
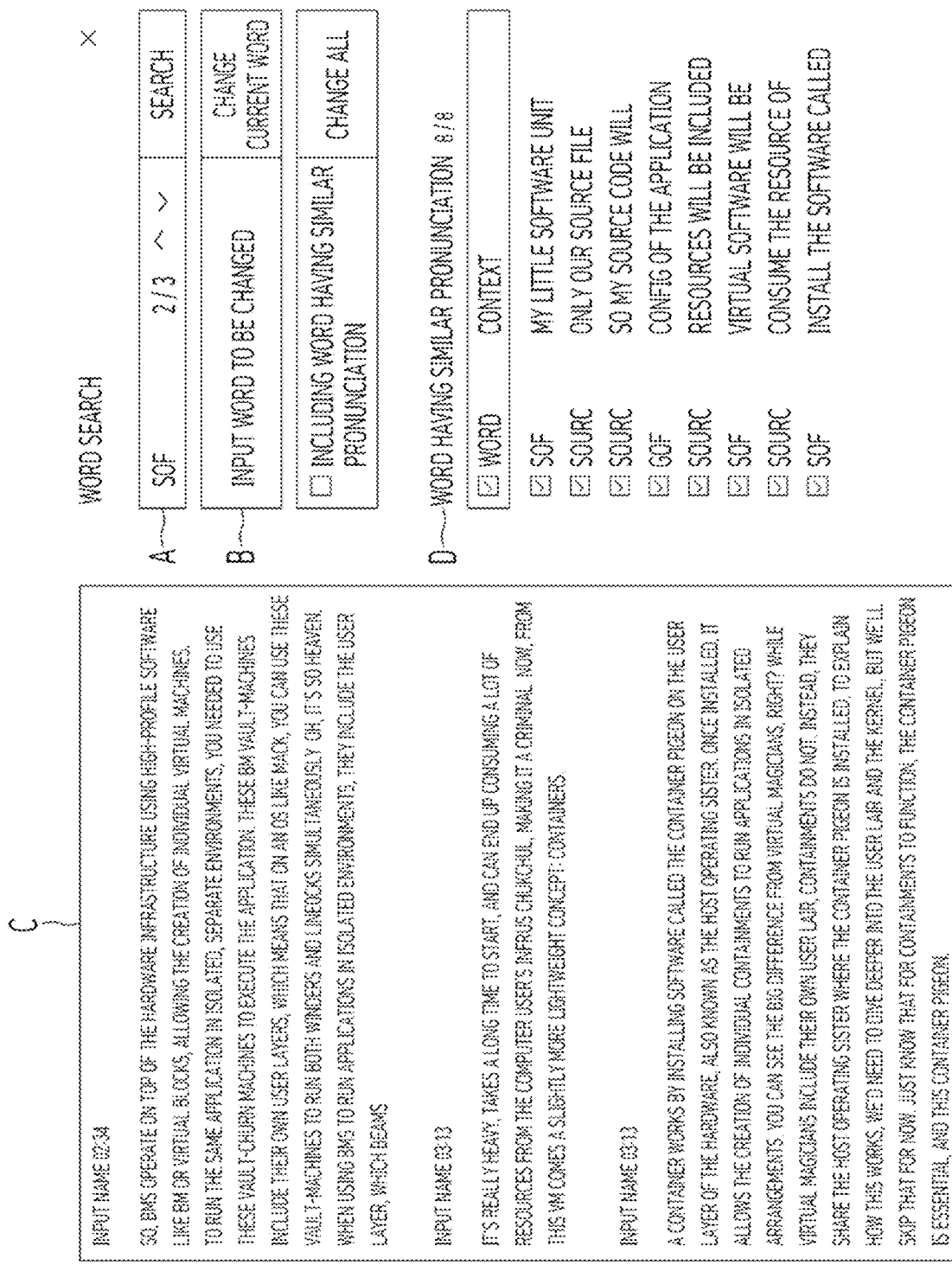
FIG. 8 is a diagram illustrating an exemplary embodiment of outputting the target word to a user interface in order to identify the word corresponding to the target word in the text information according to an exemplary embodiment of the present disclosure.

FIG. 8 is a diagram illustrating an exemplary embodiment of outputting the target word to a user interface in order to identify the word corresponding to the target word in the text information according to an exemplary embodiment of the present disclosure.

Referring to FIG. 8, A is an interface that includes target words determined based on at least one of ① the operation of determining the target word based on the keyword dictionary of a predetermined field, ② the operation of determining the target word the word of which emergency frequency is equal to or more than a threshold in the text information, or ④ the operation of determining the target word based on the confidence related to the voice recognition in the target word search module 113.

B is an interface provided to ③ determine the target word based on the input information received through the user interface in the target word search module 113.

C is an interface providing the word (similar word) by using the visual effect such as highlight in the text information (original text information) output by the output module 115.

D is an interface determining the threshold for the edit distance associated with the target word and determining the word of which the edit distance from the target word among the words included in the text information is equal to or less than the threshold to provide a result of identifying the word corresponding to the target word based on the determined word by the similar word search module 114.

As an example, when the target word is "소프", the similar word search module 114 determines the threshold for the edit distance associated with the target word and determining the word of which the edit distance from the target word (e.g., is "소프") among the words included in the text information is equal to or less than the threshold to identify the word corresponding to the target word like "소프", "소스", and "고플" based on the determined word.

According to an exemplary embodiment of the present disclosure, when the computing device 100 directly receives the target word from the user, the computing device 100 may more conveniently change the word (similar word) to the target word in a batch when the user modifies the text information. The computing device 100 may provide the search result of the word (similar word) more consistent with the user intention by excluding the word from the search result when the spacing or sentence symbol is included in the identified (searched) result when identifying (searching) the word (similar word) in relation to whether the spacing or sentence symbol described in FIG. 7 is included.

When the computing device 100 does not directly receive the target word from the user, i.e., the computing device 100 may determine the target word in the received text information, determine the word of which the edit distance from the target word among the words included in the text information is equal to or less than the threshold, and then, identify the word corresponding to the target word based on the determined word. Unlike Exemplary Embodiment 1 described above, since the operations are performed without user's intervention, performance may be enhanced.

When the text information includes the text information generated through the voice recognition, the computing device 100 determines the target word based on the confidence related to the voice recognition, but compares words having a low confidence with the text generated through the voice recognition to provide a recommended word through the user interface, thereby performing more accurate learning.

However, the plurality of exemplary embodiments mentioned in the description described above are some exemplary embodiments, but are not limited thereto.

Figure 9:
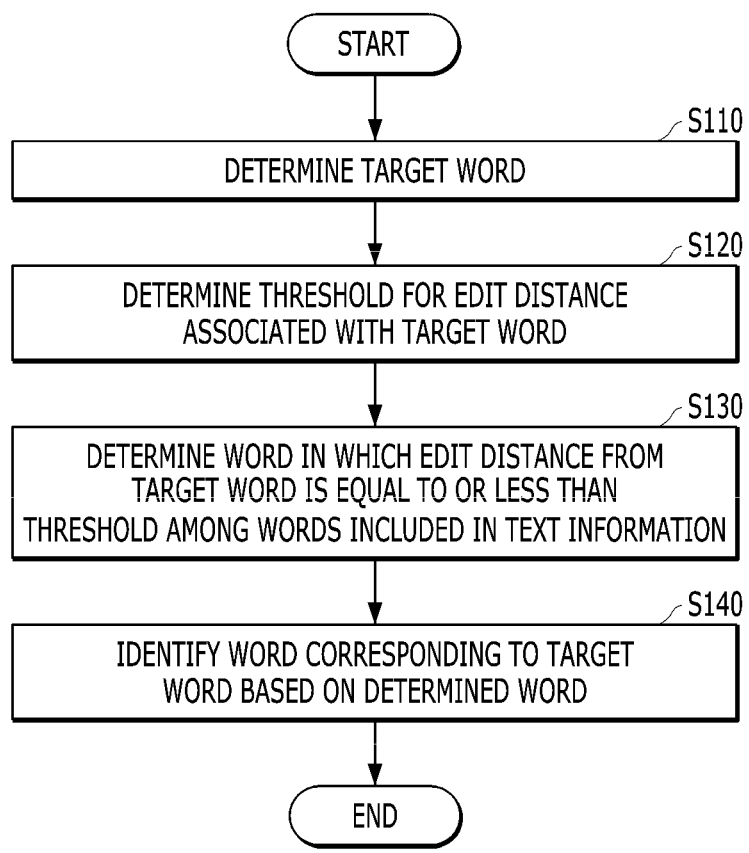
FIG. 9 is a flowchart illustrating a method for identifying the word corresponding to the target word in the text information according to an exemplary embodiment of the present disclosure.

FIG. 9 is a flowchart illustrating a method for identifying the word corresponding to the target word in the text information according to an exemplary embodiment of the present disclosure.

The method for identifying the word corresponding to the target word in the text information illustrated in FIG. 9 may be performed by the computing device 100 described above. Therefore, although not mentioned below in detail, the contents described with respect to the computing device 100 may also be similarly applied to the description of the method for identifying the word corresponding to the target word in the text information.

Referring to FIG. 9, the method for identifying the word corresponding to the target word in the text information according to an exemplary embodiment of the present disclosure may include determining a target word (S110), determining a threshold for an edit distance associated with the target word (S120), determining a word of which the edit distance from the target word is equal to or less than the threshold among words included in text information (S130), and identifying a word corresponding to the target word based on the determined word (S140), and include various steps in addition to the steps. Further, the method for identifying the word corresponding to the target word in the text information according to an exemplary embodiment of the present disclosure may be performed by the computing device 100.

Step S110 above is a step of determining the target word. Step S110 above may include at least one of a step of determining the target word based on a keyword dictionary of a predetermined field, a step of determining a word of which emergency frequency is equal to or more than a threshold in the text information as the target word, or a step of determining the target word based on input information received through a user interface. Further, step S110 may include a step of determining the target word based on a confidence related to the voice recognition when the text information is text information generated through voice recognition. In this case, the word corresponding to the target word may be determined based on a pronunciation or a text, and the edit distance may be calculated based on the pronunciation or the text.

Step S120 above is a step of determining a threshold for an edit distance associated with the target word. Step S120 above may include a step of dynamically determining the threshold for the edit distance in response to a length of the target length. The step of dynamically determining the threshold for the edit distance may include dynamically determining the threshold for the edit distance based on a calculation between the length of the target length and a predetermined ratio threshold. Further, the step of determining the threshold for the edit distance further may include identifying an absolute threshold, and the step of determining the word of which the edit distance from the target word is equal to or less than the threshold may further include identifying a word of which the edit distance from the target word is equal to or less than the dynamically determined threshold, and equal to or less than the absolute threshold. Further, step S120 above may also further include a step of determining an absolute threshold.

Step S130 above is a step of determining a word of which the edit distance from the target word among words included in target information is equal to or more less than the threshold. Step S130 above may include determining a word of which the edit distance from the target word is equal to or less than the dynamically determined threshold, and equal to or less than the absolute threshold. Further, step S130 above may include a step of dividing the target word into k+1 elements when the determined threshold is k, searching the k+1 elements in the text information, a step of identifying the word based on the searched element when at least one element among the k+1 elements is searched in the text information, and a step of determining that there is no word of which the edit distance is equal to or less than the threshold when the k+1 elements are not searched in the text information.

Step S130 above may also include a step of converting words included in the text information and the target word into pronunciation symbols, a step of identifying pronunciation symbols of which the edit distance from the pronunciation symbols for the target is equal to or less than the threshold among the pronunciation symbols for the text information, and a step of identifying the word based on the identified pronunciation symbols. Here, the edit distance may be determined based on the pronunciation. As an example, the step of converting the words included in the text information and the target word into the pronunciation symbols may include a step of converting the words included in the text information and the target word into an International Phonetic Alphabet (IPA) alphabet, a step of converting the converted IPA alphabets into Roman notations, separating the converted Roman notations into grapheme units, and a step of converting the separated grapheme unit into a phoneme unit.

Step S130 above may also include a step of converting the words included in the text information and the target word into the grapheme units, a step of identifying graphemes of which the edit distance from the graphemes for the target word is equal to or less than the threshold among the graphemes for the text information, and a step of identifying the word based on the identified graphemes. Here, the edit distance may be determined based on the text.

Step S130 above may include a step of converting the words included in the text information and the target word into the pronunciation symbols or the graphemes, and the step of converting the words included in the text information and the target word into the pronunciation symbols or the graphemes may include a step of selecting whether to consider at least one of a spacing or the sentence symbol.

Step S140 above is a step of being capable of identifying the word corresponding to the target word based on the determined word. Step S140 above may further include a step of a similarity between speech information associated with the target word and speech information associated with the text information, and a step of identifying the word corresponding to the target word by additionally considering the calculated similarity. Here, the text information may include the text information generated through the voice recognition.

The steps mentioned in the above description may be further divided into additional steps or combined into fewer steps, according to an embodiment of the present disclosure. In addition, some steps may be omitted as necessary, and the order between the steps may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 10:
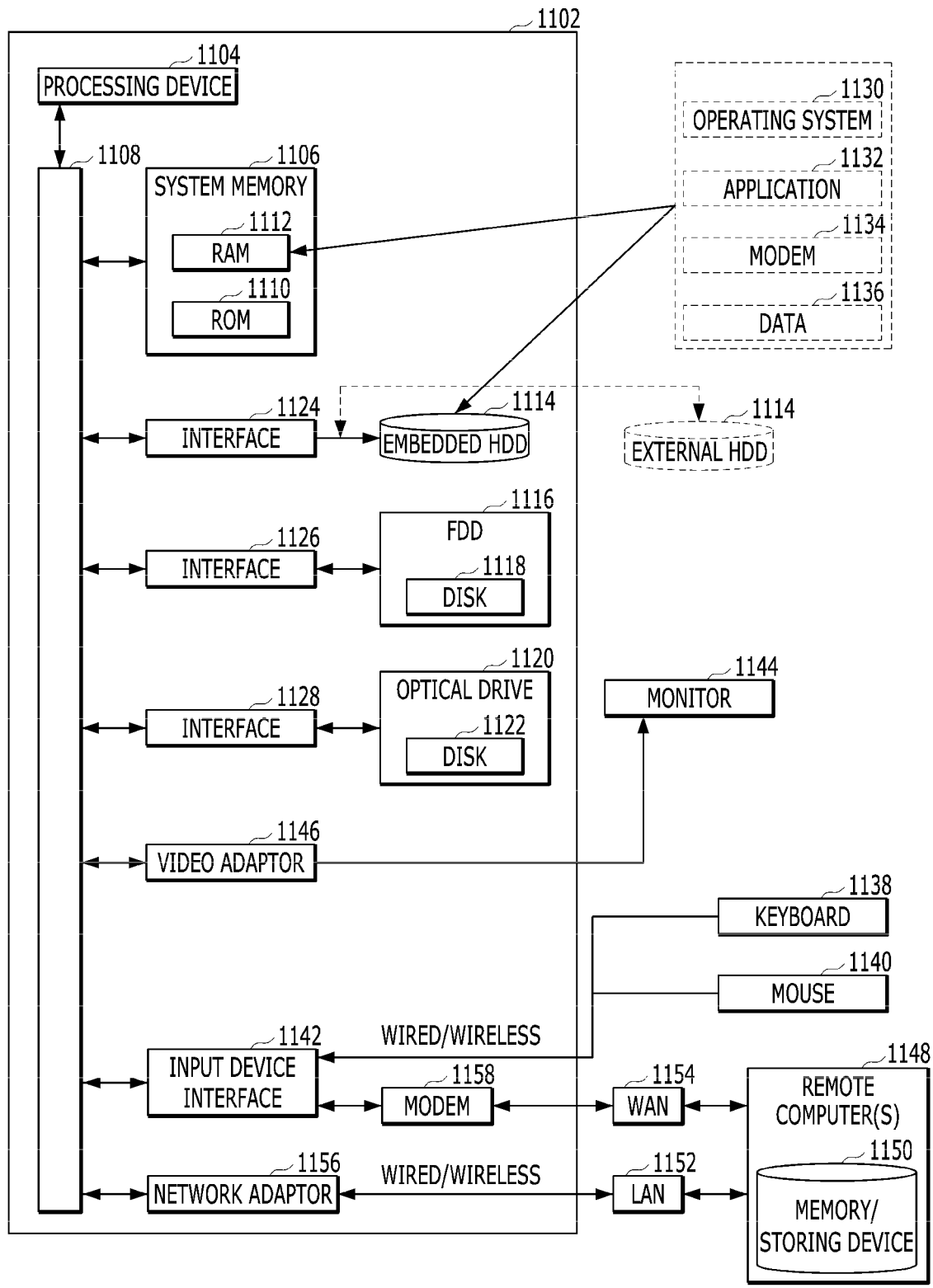
FIG. 10 is a conceptual view of a computing environment according to an exemplary embodiment of the present disclosure.

FIG. 10 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for identifying a word corresponding to a target word, the method is performed by a computing device including at least one processor, the method comprising:
   obtaining original voice data of a user via an input module, wherein a transcription result is generated from the original voice data;
   receiving a set of modified text associated with a set of portions of the transcription result generated from the original voice data;
   training a speech recognition model for the user using the set of modified text paired with a set of portions of the original voice data respectively corresponding to the set of portions of the transcription result, wherein the speech recognition model is trained using a neural network comprising a plurality of layers through which the set of modified text paired with the set of portions of the original voice data is processed;
   outputting, by the speech recognition model that was trained, text information comprising a set of words;
   determining the target word from the set of words included in the text information, including at least one of:
   determining the target word based on a keyword dictionary of a predetermined field,
      determining a word of which frequency is equal to or more than a threshold in the text information as the target word, or
      determining the target word based on input information received through a user interface;
   determining a threshold for an edit distance associated with the target word by multiplying a length of the target word by a predetermined ratio threshold;
   determining, from the set of words included in the text information, at least one word of which the edit distance from the target word is equal to or less than the threshold; and
   identifying, from the at least one word, the word corresponding to the target word.

2. The method of claim 1, wherein the text information includes text information generated through speech recognition, and
   the determining of the target word includes determining the target word based on a confidence related to the speech recognition.

3. The method of claim 1, wherein the text information includes text information generated through speech recognition, and
   the identifying of the word corresponding to the target word further includes:
      calculating a similarity between voice information associated with the target word and voice information associated with the text information, and
      identifying the word corresponding to the target word by additionally considering the calculated similarity.

4. The method of claim 1, wherein the determining of the threshold for the edit distance further includes determining an absolute threshold, and
   the determining of the at least one word of which the edit distance from the target word is equal to or less than the threshold further includes determining a word of which the edit distance from the target word is equal to or less than the threshold, and equal to or less than the absolute threshold.

5. The method of claim 1, wherein the determining of the at least one word of which the edit distance from the target word is equal to or less than the threshold includes:
   dividing the target word into k+1 elements when the determined threshold is k,
   searching the k+1 elements in the text information,
   identifying the at least one word based on the searched element when at least one element among the k+1 elements is searched in the text information, and
   determining that there is no word of which the edit distance is equal to or less than the threshold when the k+1 elements are not searched in the text information.

6. The method of claim 1, wherein the word corresponding to the target word is identified based on a pronunciation or a text, and
   the edit distance is calculated based on the pronunciation or the text.

7. The method of claim 6, wherein the edit distance is determined based on the pronunciation, and the determining of the at least one word of which the edit distance from the target word is equal to or less than the threshold includes:
   converting words included in the text information and the target word into pronunciation symbols,
   identifying pronunciation symbols of which the edit distance from the pronunciation symbols for the target word is equal to or less than the threshold among the pronunciation symbols for the text information, and
   determining the at least one word based on the identified pronunciation symbols.

8. The method of claim 7, wherein the converting of the words included in the text information and the target word into the pronunciation symbols includes:
   converting the words included in the text information and the target word into an International Phonetic Alphabet (IPA) alphabet,
   converting the converted IPA alphabets into Roman notations,
   separating the converted Roman notations into grapheme units, and
   converting the separated grapheme unit into a phoneme unit.

9. The method of claim 6, wherein the edit distance is determined based on the text, and the determining of the at least one word of which the edit distance from the target word is equal to or less than the threshold includes:
   converting the words included in the text information and the target word into the grapheme units,
   identifying graphemes of which the edit distance from the graphemes for the target word is equal to or less than the threshold among the graphemes for the text information, and
   determining the at least one word based on the identified graphemes.

10. The method of claim 6, wherein the determining of the at least one word of which the edit distance from the target word is equal to or less than the threshold includes converting the words included in the text information and the target word into the pronunciation symbols or the graphemes, and the converting of the words included in the text information and the target word into the pronunciation symbols or the graphemes includes selecting whether to consider at least one of a spacing or the sentence symbol.

11. A computer program stored in a non-transitory computer-readable storage medium, wherein the computer program executes the following operations for identifying a word corresponding to a target word when the computer program is executed by one or more processors, the operations comprising:
   an operation of obtaining original voice data of a user via an input module, wherein a transcription result is generated from the original voice data;
   an operation of receiving a set of modified text associated with a set of portions of the transcription result generated from the original voice data;
   an operation of training a speech recognition model for the user using the set of modified text paired with a set of portions of the original voice data respectively corresponding to the set of portions of the transcription result, wherein the speech recognition model is trained using a neural network comprising a plurality of layers through which the set of modified text paired with the set of portions of the original voice data is processed;
   an operation of outputting, by the speech recognition model that was trained, text information comprising a set of words;
   an operation of determining the target word from the set of words included in the text information, including at least one of:
      an operation of determining the target word based on a keyword dictionary of a predetermined field,
      an operation of determining a word of which frequency is equal to or more than a threshold in the text information as the target word, or
      an operation of determining the target word based on input information received through a user interface;
   an operation of determining a threshold for an edit distance associated with the target word by multiplying a length of the target word by a predetermined ratio threshold;
   an operation of determining, from the set of words included in the text information, at least one word of which the edit distance from the target word is equal to or less than the threshold; and
   an operation of identifying, from the at least one word, the word corresponding to the target word.

12. A computing device for identifying a word corresponding to a target word in text information, comprising:
   at least one processor; and
   a memory,
   wherein at least one processor is configured to:
      obtain original voice data of a user via an input module, wherein a transcription result is generated from the original voice data,
      receive a set of modified text associated with a set of portions of the transcription result generated from the original voice data,
      train a speech recognition model using modified text data paired with a set of portions of the original voice data respectively corresponding to the set of portions of the transcription result, wherein the speech recognition model is trained using a neural network comprising a plurality of layers through which the set of modified text paired with the set of portions of the original voice data is processed,
      output, by the speech recognition model that was trained, text information comprising a set of words,
      determine the target word from the set of words included in the text information, including at least one of:
         determine the target word based on a keyword dictionary of a predetermined field,
         determine a word of which frequency is equal to or more than a threshold in the text information as the target word, or
         determine the target word based on input information received through a user interface,
      determine a threshold for an edit distance associated with the target word by multiplying a length of the target word by a predetermined ratio threshold,
      determine, from the set of words included in the text information, at least one word of which the edit distance from the target word among words included in text information is equal to or less than the threshold, and
      identify, from the at least one word, the word corresponding to the target word.

* * * * *